(12) United States Patent
Bagnall (10) Patent No.: US 10,710,010 B1
(45) Date of Patent: Jul. 14, 2020

(54) AQUARIUM FILTER HOUSING UNIT

(71) Applicant: ZOO MED LABORATORIES, INC., San Luis Obispo, CA (US)

(72) Inventor: Gary W Bagnall, San Luis Obispo, CA (US)

(73) Assignee: ZOO MED LABORATORIES, INC., Arroyo Grande, CA (US)

( * ) Notice: Subject to any disclaimer, the term of this patent is extended or adjusted under 35 U.S.C. 154(b) by 0 days.

(21) Appl. No.: 16/546,611

(22) Filed: Aug. 21, 2019

Related U.S. Application Data (60) Provisional application No. 62/816,963, filed on Mar. 12, 2019.

(51) Int. Cl.
| | |
|---|---|
| *B01D 35/30* | (2006.01) |
| *A01K 63/04* | (2006.01) |
| *C02F 1/00* | (2006.01) |
| *B01D 39/20* | (2006.01) |

(52) U.S. Cl.
CPC .......... *B01D 35/306* (2013.01); *A01K 63/045* (2013.01); *A01K 63/047* (2013.01); *B01D 39/2055* (2013.01); *C02F 1/001* (2013.01); *B01D 2201/306* (2013.01)

(58) Field of Classification Search
CPC .............. B01D 35/306; B01D 39/2055; B01D 2201/306; A01K 63/045; A01K 63/047; C02F 1/001
USPC .............. 210/232, 167.21, 337, 416.1, 416.2
See application file for complete search history.

(56) References Cited

U.S. PATENT DOCUMENTS

| | | | |
|---|---|---|---|
| 3,387,587 A * | 6/1968 | Smith .................. | A01K 63/045 119/211 |
| 3,891,555 A | 6/1975 | Bennett et al. | |
| 5,567,315 A * | 10/1996 | Weidenmann ....... | A01K 63/045 119/262 |
| 7,208,084 B2 | 4/2007 | Axelrod | |
| 7,241,379 B2 | 7/2007 | Agresta | |
| 7,303,665 B1 * | 12/2007 | Claudio-Alvarado ....... | A01K 63/045 119/259 |
| 8,679,330 B2 | 3/2014 | Mihlbauer et al. | |
| 8,702,981 B2 | 4/2014 | Lutz et al. | |
| 2006/0049086 A1 * | 3/2006 | Axelrod ............... | A01K 63/045 210/167.21 |
| 2015/0181843 A1 | 7/2015 | Lutz et al. | |

FOREIGN PATENT DOCUMENTS

JP     2016146797 A     8/2016

\* cited by examiner

*Primary Examiner* — Fred Prince
(74) *Attorney, Agent, or Firm* — Welsh Flaxman & Gitler LLC (57) ABSTRACT

An aquarium filter housing unit includes a top chamber composed of a fluid impeller housing and a fluid impeller, as well as a bottom chamber for a replaceable filter cartridge. The top chamber and the bottom chamber are formed as separate units and are held together via a friction fit along a bottom edge of the top chamber and a top edge of the bottom chamber. The bottom chamber includes a plurality of bottom chamber sidewalls and a base wall, wherein a door is provided for selectively accessing the filter cartridge held within in the bottom chamber.

11 Claims, 10 Drawing Sheets

AQUARIUM FILTER HOUSING UNIT

CROSS REFERENCE TO RELATED APPLICATION

This application claims the benefit of U.S. Provisional Patent Application Ser. No. 62/816,963, filed Mar. 12, 2019, entitled "Internal Removable Aquarium Filter", the disclosure of which is incorporated herein by reference in its entirety.

BACKGROUND OF THE INVENTION

1. Field of the Invention

The present invention generally relates to an aquarium filter housing unit.

2. Description of the Related Art

Aquariums have filter arrangements with filter elements that allow the removal of waste materials from water contained in the aquarium. It is common to mount these filter arrangements on the side of a tank or place the arrangement on the bottom of an aquarium tank. Water, inside of an aquarium, runs through the filter elements and allows waste materials that exist in the water to be removed by the filter element. This constant flow of the water allows a continuous cleaning of the aquarium tank to occur.

When the filter is saturated by the waste materials, water no longer can easily flow through the filter element and the process of cleaning no longer occurs. At this point, it is important to clean or replace the filter element. The cleaning or replacement is usually facilitated by removal of the filter arrangement out of the aquarium tank. This is a time consuming and messy procedure.

A better replacement scheme whereby the filter element is removed while the filter arrangement remains in the aquarium tank will alleviate this problem.

SUMMARY OF THE INVENTION

It is, therefore, an object of the present invention to provide an aquarium filter housing unit for an aquarium. The aquarium filter housing unit includes both a top chamber and a bottom chamber. The top chamber is composed of a fluid impeller housing and a fluid impeller, while the bottom chamber is shaped and dimensioned for selectively receiving a replaceable filter cartridge. The top chamber and the bottom chamber are formed as separate units and are matingly held together via a friction fit. The bottom chamber defines a space in which the filter cartridge is positioned for retrieval and replacement in a convenient, reliable, and time efficient manner. As such, and as is discussed below in greater detail, the bottom chamber includes a pivoting door shaped and dimensioned for the retrieval and replacement of filter cartridges in accordance with usage of the present aquarium filter housing unit.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 18, an aquarium filter housing unit 10 for an aquarium 100 is disclosed. The aquarium filter housing unit 10 includes a housing 12 in which both a filter cartridge 14 and a fluid impeller (including motor (not shown)) 16 are stored. The housing 12 includes a top chamber 18 and a bottom chamber 20. The top chamber 18 and the bottom chamber 20 are formed as separate units and are matingly held together via a friction fit along their respective bottom edge 18b and top edge 20t. In particular, the top edge 20t of the bottom chamber 20 includes an upwardly extending lip 20u1 in which the bottom edge 18b of the top chamber 18 sits.

The top chamber 18 is composed of the fluid impeller housing 15 and the fluid impeller 16 which is housed within the fluid impeller housing 15. As such, the top chamber 18 is formed as a separate unit that is secured to the bottom chamber 20.

The bottom chamber 20 defines a space in which the filter cartridge 14 is positioned for retrieval and replacement in a convenient, reliable, and time efficient manner. As such, and as is discussed below in greater detail, the bottom chamber 20 includes a pivoting door 40 shaped and dimensioned for the retrieval and replacement of filter cartridges 14 in accordance with usage of the present aquarium filter housing unit 10.

Figure 19:
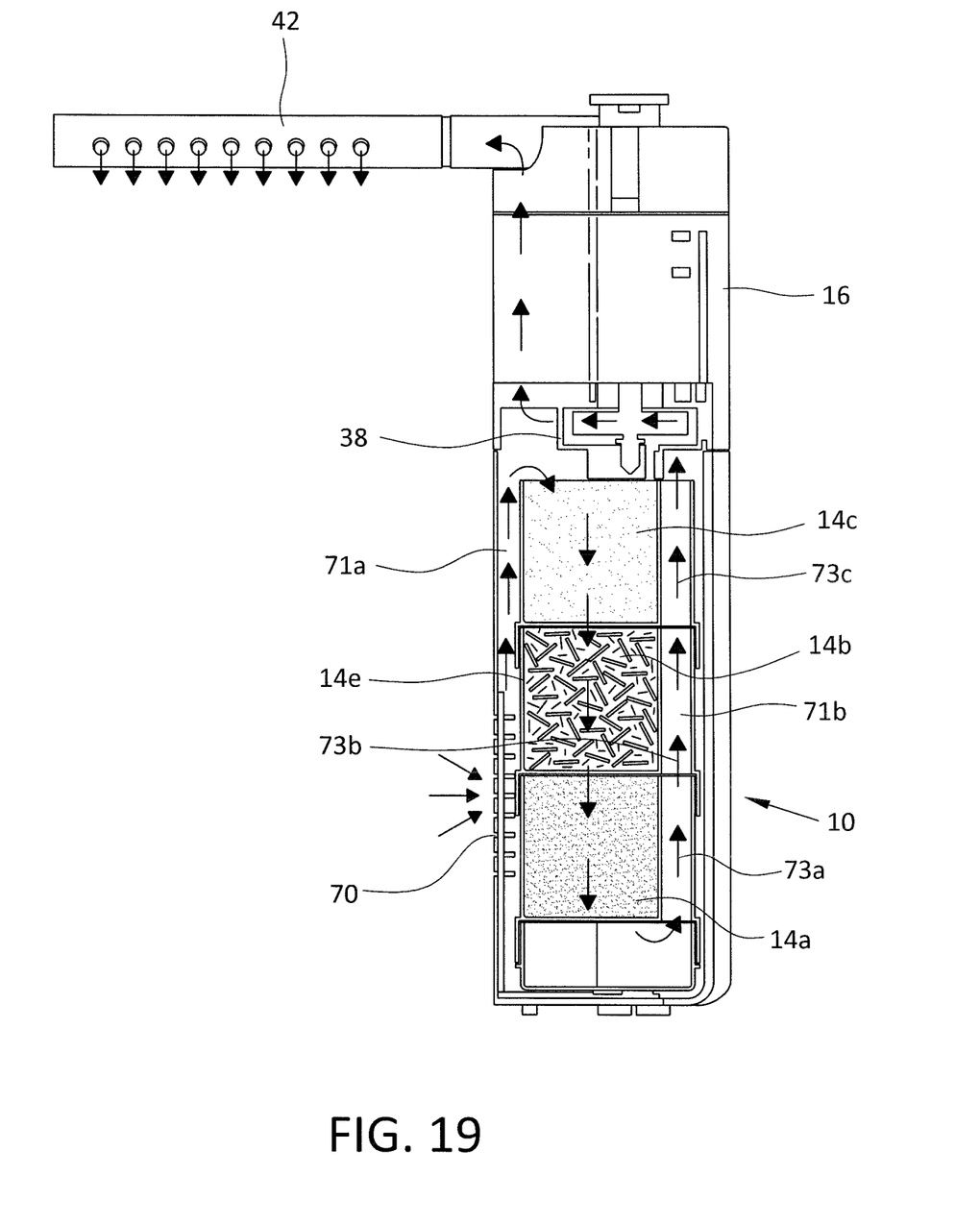
FIG. 19 is sectional view showing the flow of water through the aquarium filter housing unit.

In accordance with a preferred embodiment, the filter cartridge 14 is composed of three stackable modules. In particular, the bottom first filter module 14a is a fine sponge module, the middle second filter module 14b is a carbon filter, and the top third filter module 14c is a course sponge filter. The modules 14a, 14b, 14c stack on each other to form the complete filter cartridge 14 shown, for example, in FIGS. 2 and 19. As will be appreciated based upon the following disclosure, the filter cartridge 14 sits within the bottom chamber 20 so as to define an upwardly flowing intake passageway 71a along one side of the bottom chamber 20.

An upwardly flowing impeller passageway 71b is defined by respective apertures 73a, 73b, 73c formed in the bottom first filter module 14a, the middle second filter module 14b, and the top third filter module 14c, which are in fluid communication when the filter cartridge 14 is fully assembled. The upwardly flowing impeller passageway 71b is positioned opposite the upwardly flowing intake passageway 71a. While the upwardly flowing impeller passageway 71b is defined by the apertures 73a, 73b, 73c of the filter modules 14a, 14b, 14c, the upwardly flowing intake passageway 71a is defined by the respective walls of the filter cartridge 14 and the bottom chamber 20; in particular, the fourth, fifth and sixth sidewalls 50, 52, 54 of the bottom chamber 20 and the exterior walls 14e of the filter cartridge 14.

Figure 1:
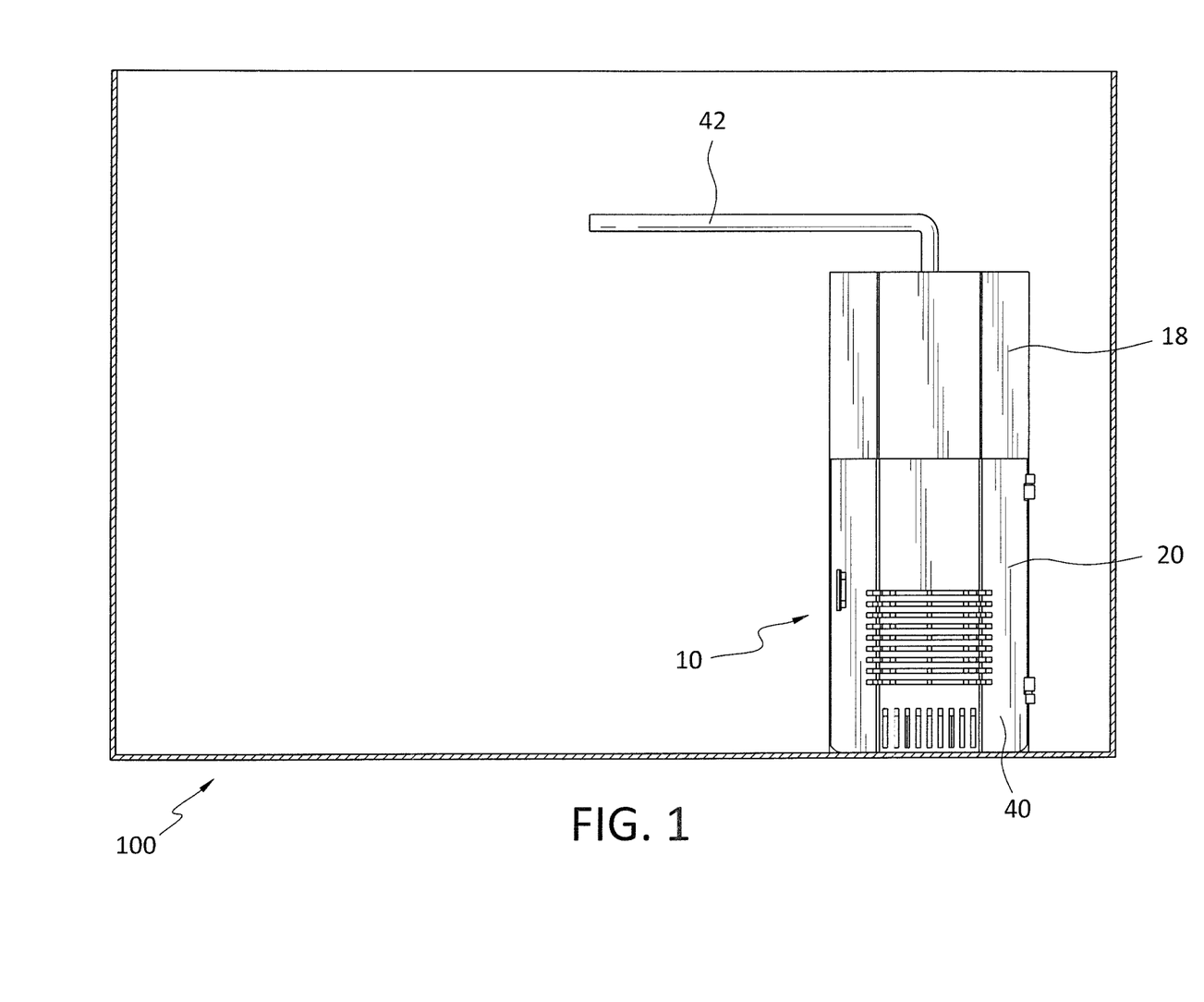
FIG. 1 is a front elevation view of the aquarium filter housing unit within an aquarium.
Figure 2:
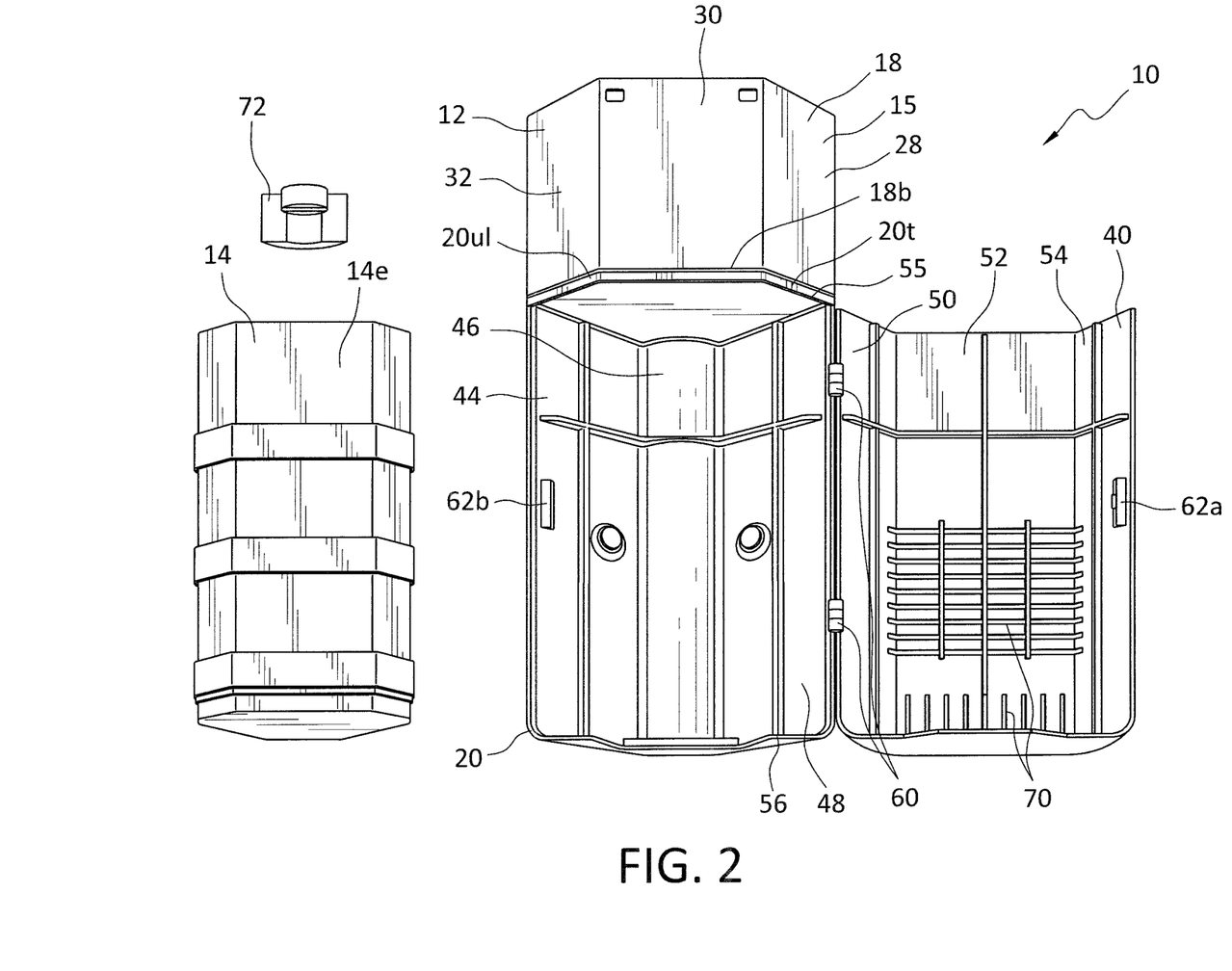
FIG. 2 is an exploded view of the aquarium filter housing unit.
Figure 3:
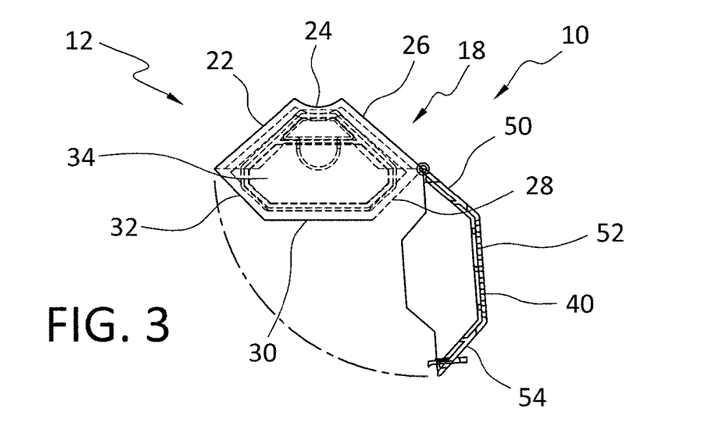
FIGS. 3, 4, 5, and 6 are respectively a top plan view, a left side view, a front elevation view, and a right side view of the aquarium filter housing unit with the door open.
Figure 4:
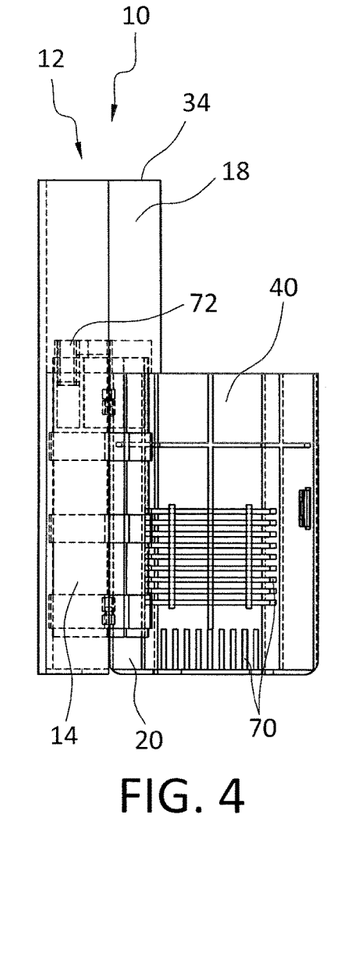
Figure 5:
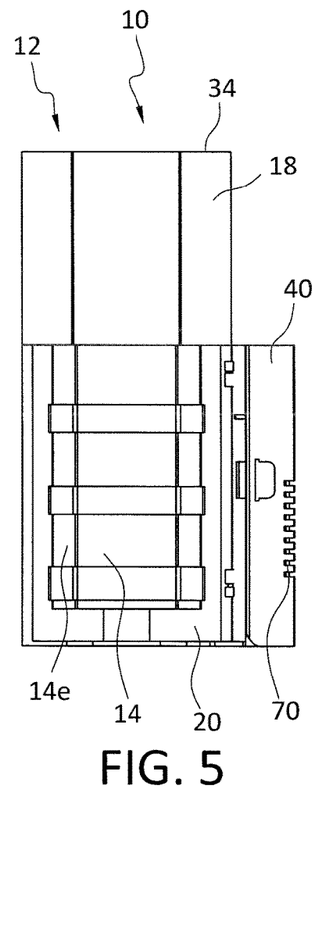
Figure 6:
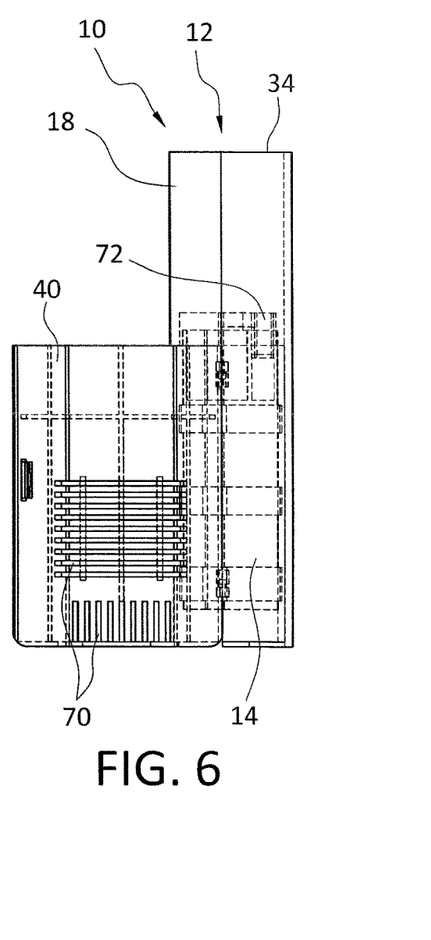
Figure 7:
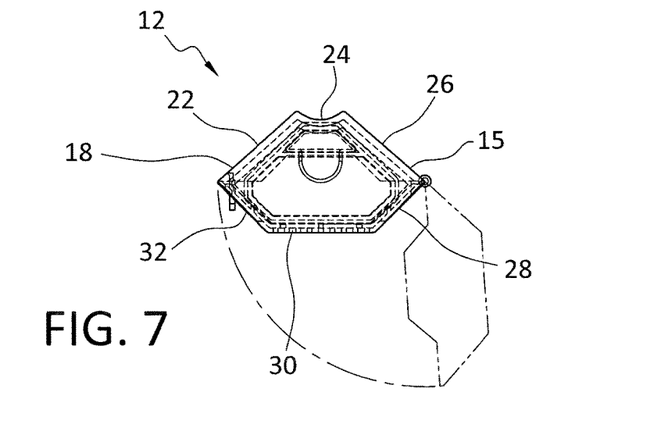
FIGS. 7, 8, 9, and 10 are respectively a top plan view, a left side view, a front elevation view, and a right side view of the aquarium filter housing unit with the door closed.
Figures 8, 9:
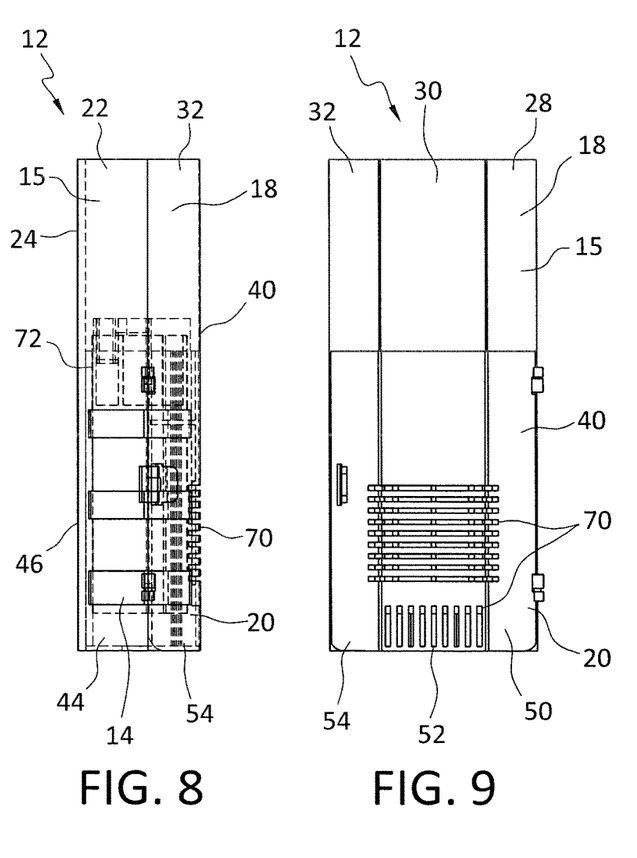
Figure 10:
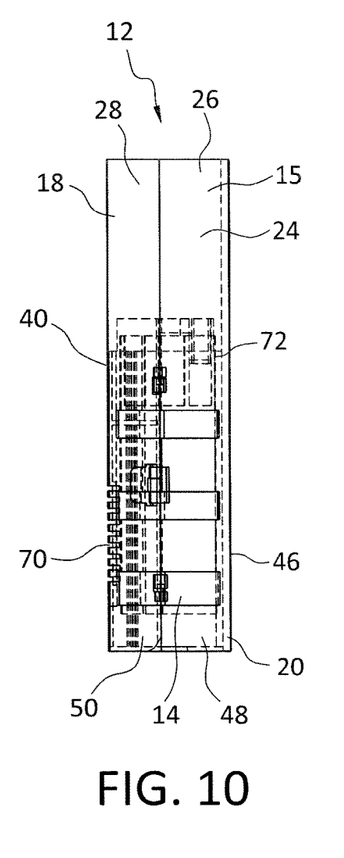
Figure 11:
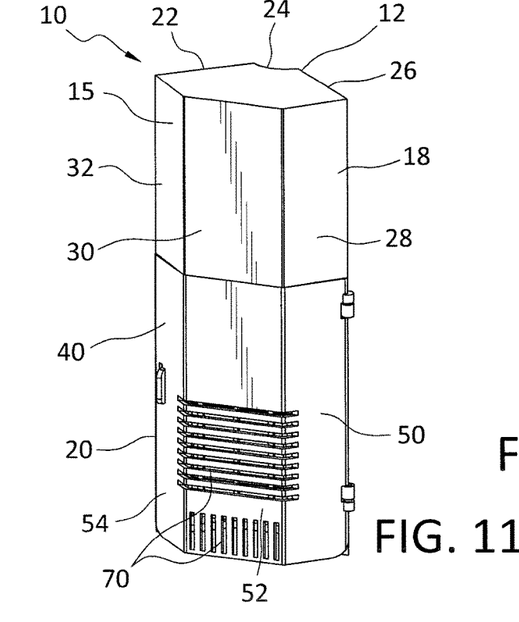
FIGS. 11 and 12 are right and left side perspective views of the aquarium filter housing unit with the door closed.
Figure 12:
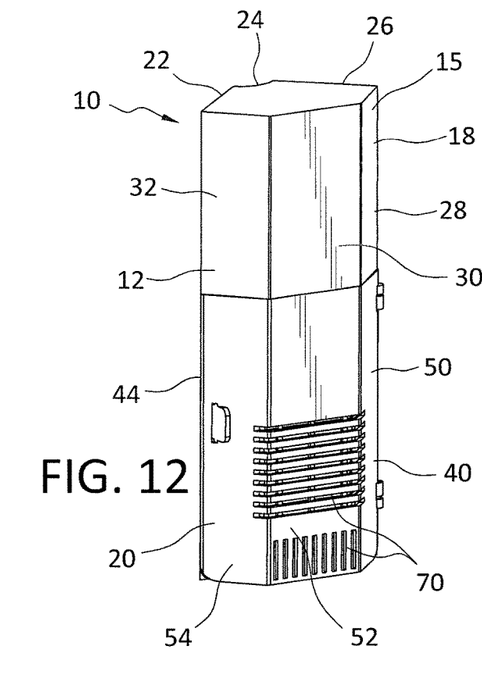
Figure 13:
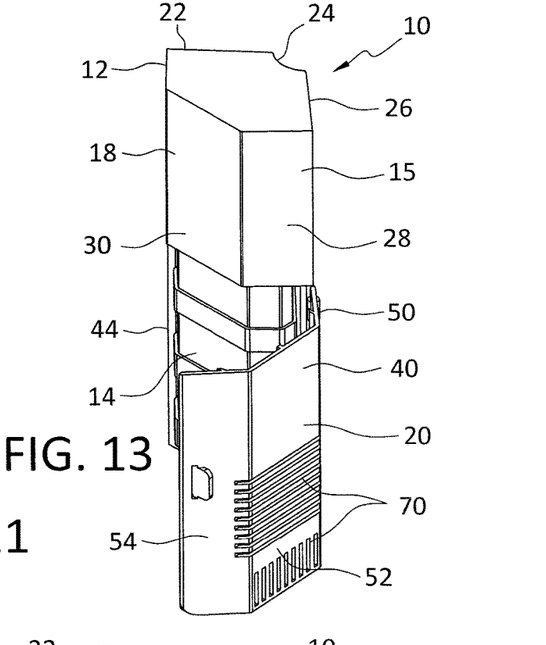
FIGS. 13 and 14 are right and left side perspective views of the aquarium filter housing unit with the door closed.
Figure 14:
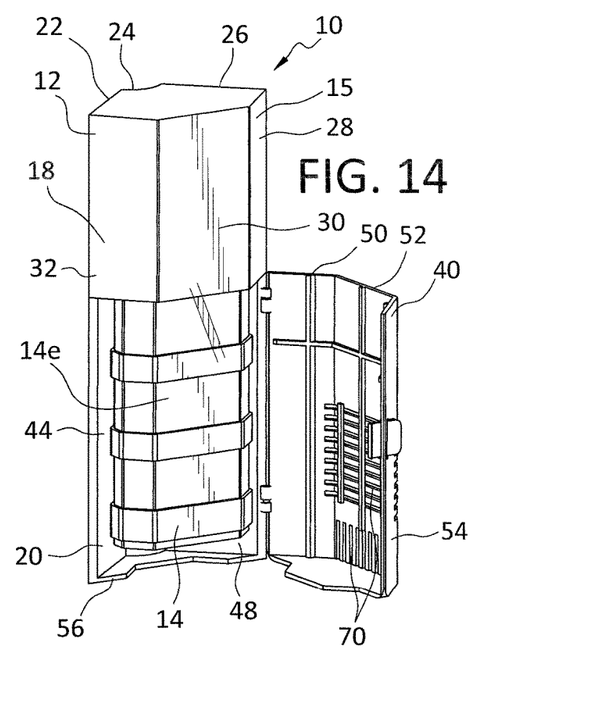
Figure 15:
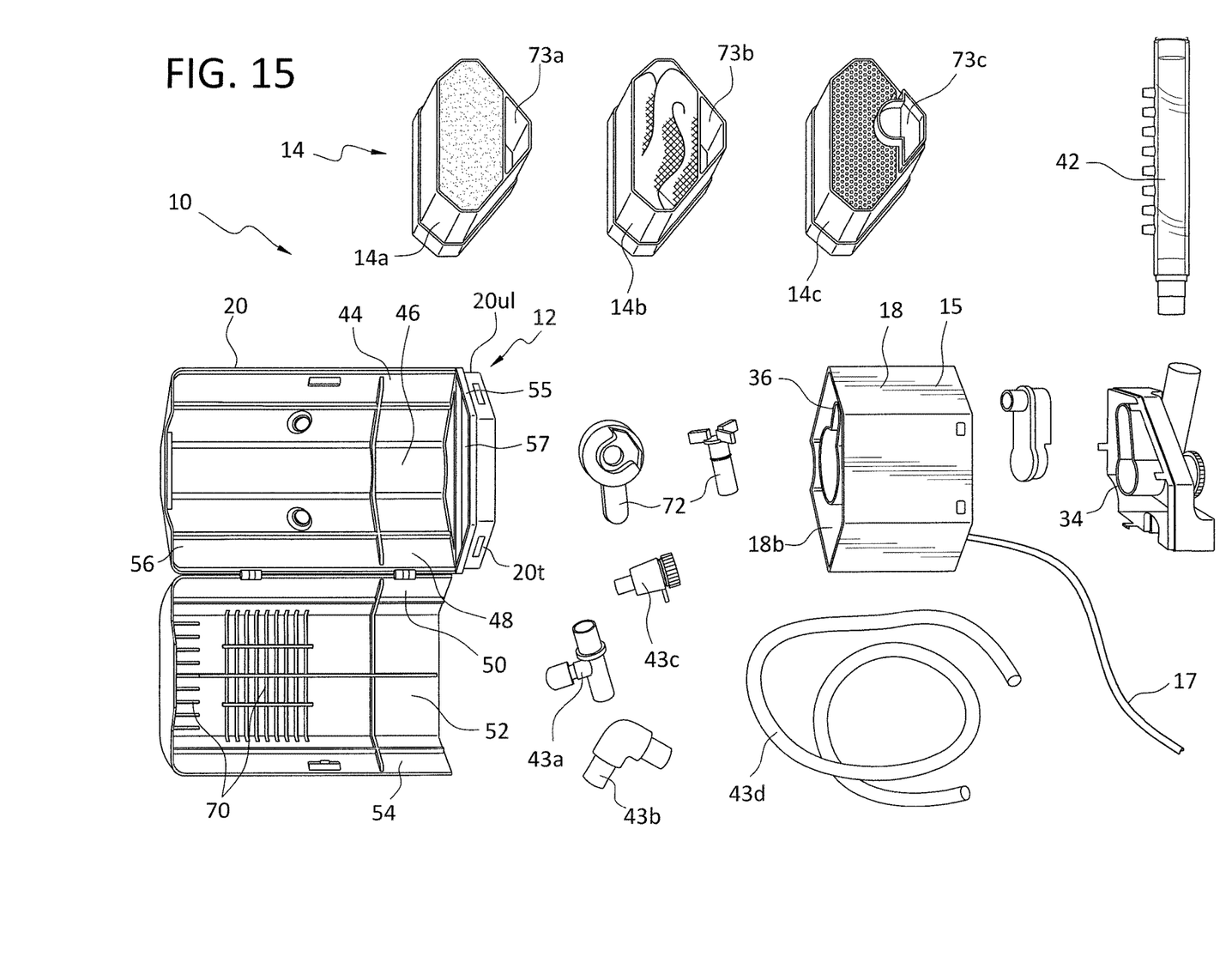
FIG. 15 is an exploded view of the aquarium filter housing unit.
Figure 16:
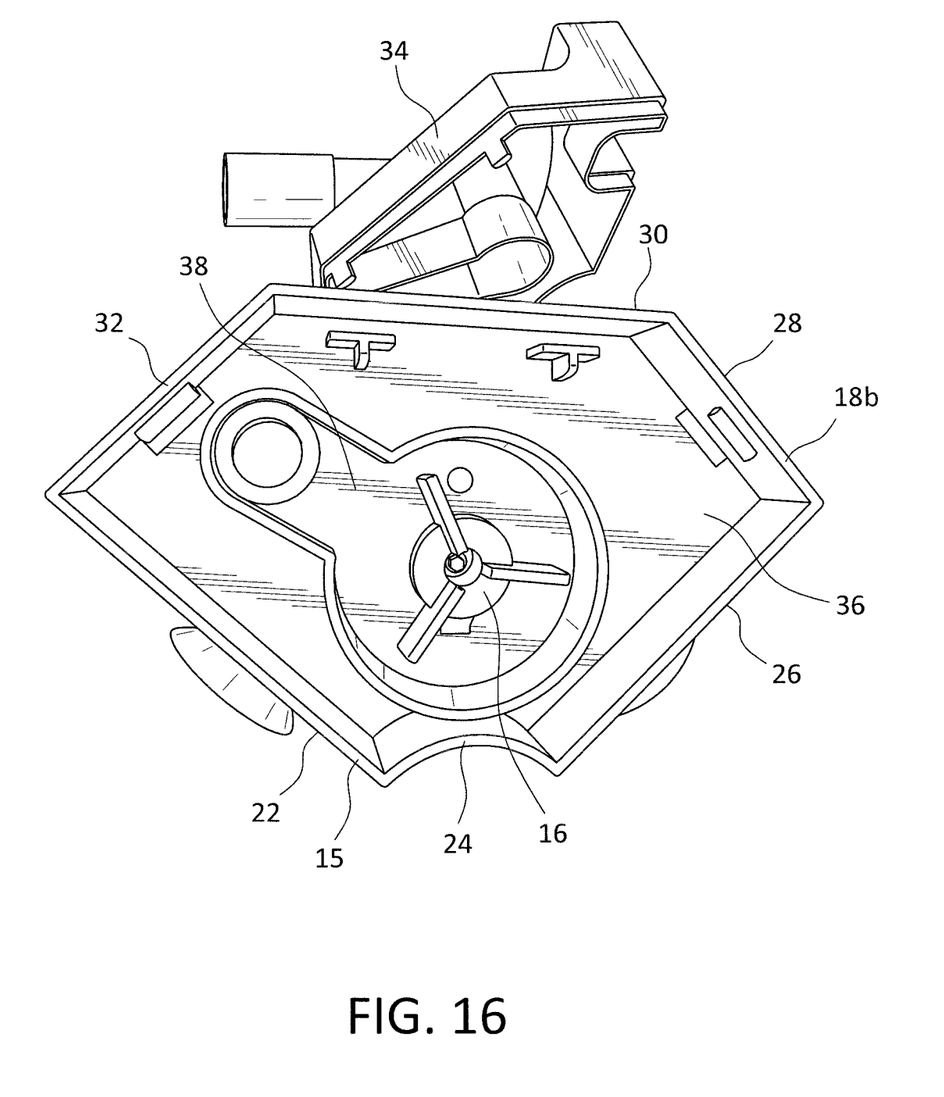
FIG. 16 is a detailed bottom view of the top chamber.
Figure 17:
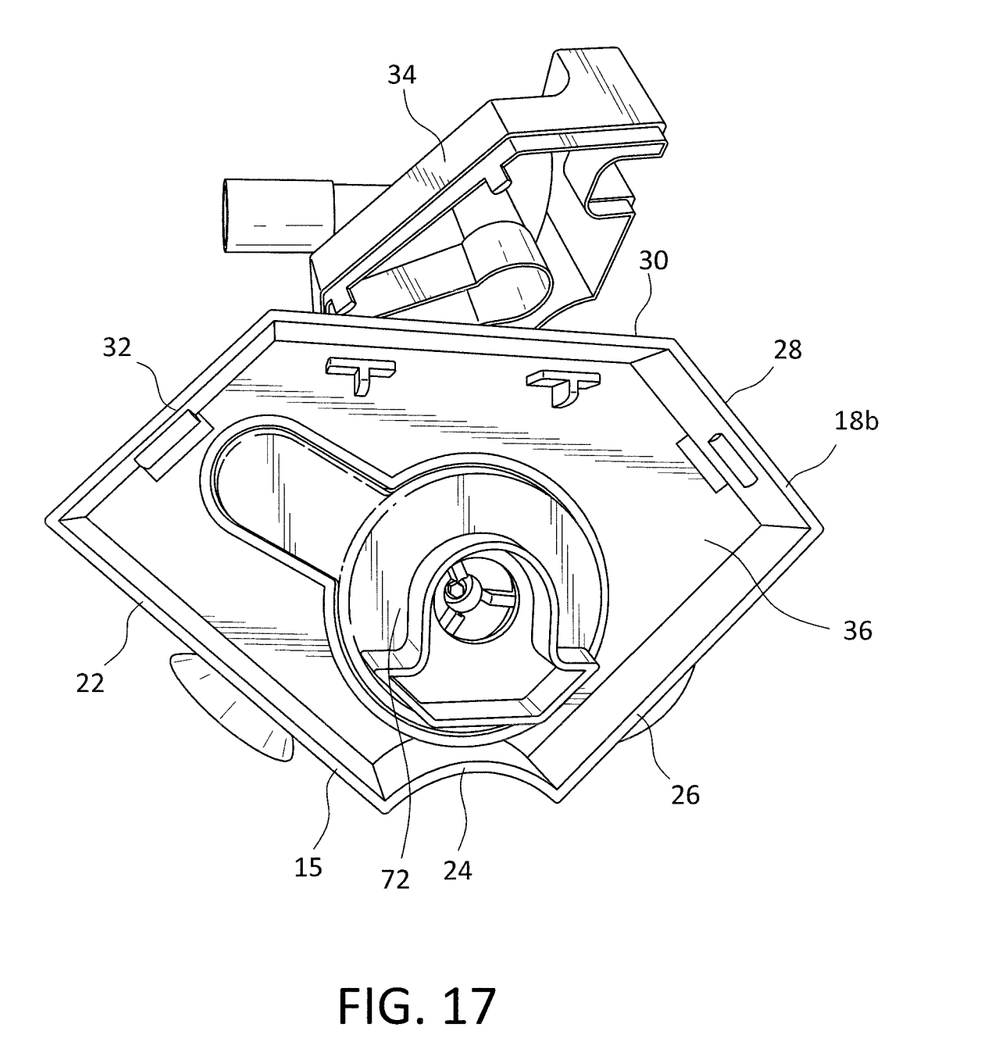
FIG. 17 is a detailed bottom view of the top chamber with the cartridge joint secured thereto.
Figure 18:
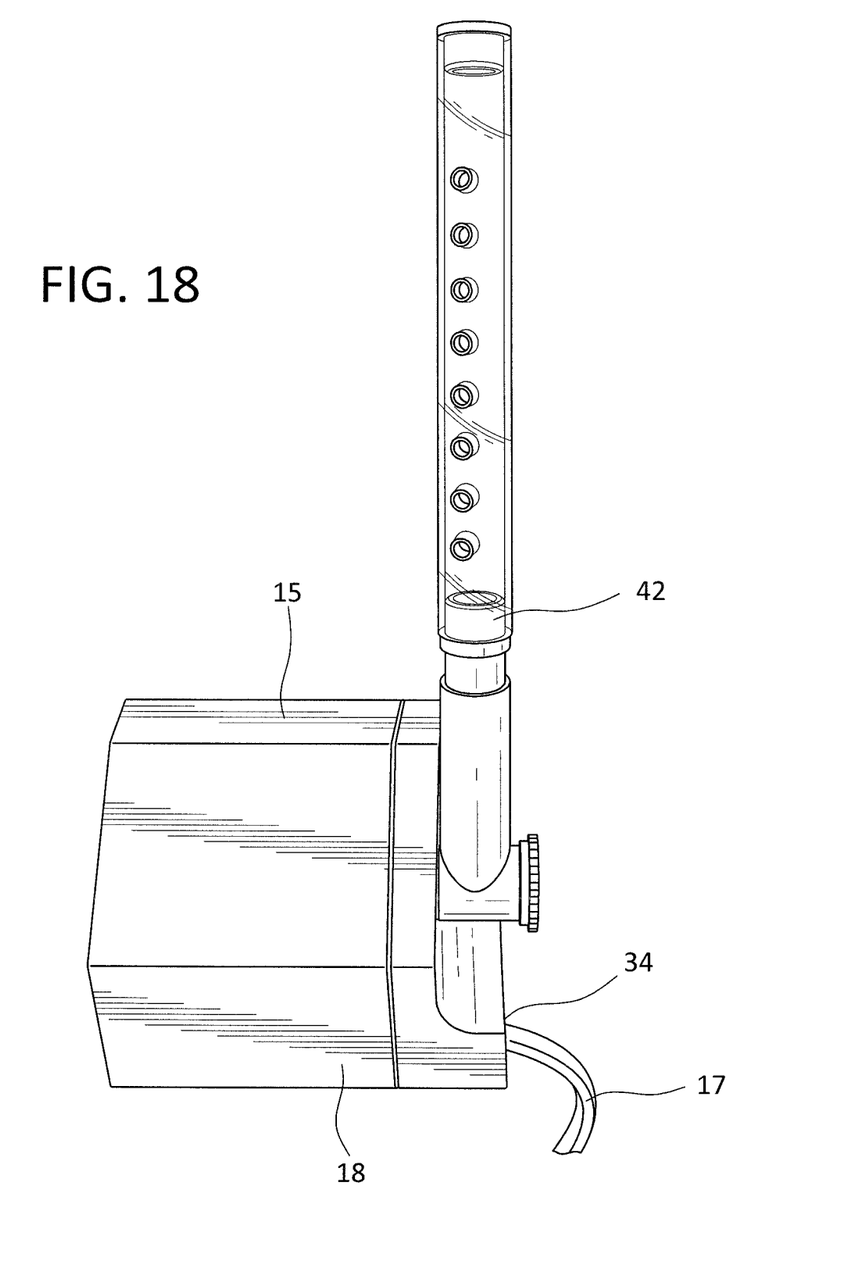
FIG. 18 shows the top chamber with the spray bar.

The top chamber 18, in particular, the fluid impeller housing 15, includes a plurality of top chamber sidewalls 22, 24, 26, 28, 30, 32 extending about the perimeter thereof. The top chamber 18 also includes a removable top cover 34 and a bottom panel 36 (also part of the fluid impeller housing 15). As will be appreciated based upon the following disclosure, the bottom panel 36 includes an aperture 38 allowing for fluid communication between the bottom chamber 20 and the top chamber 18 such that water may be drawn into the bottom chamber 20, through the filter cartridge 14, into the fluid impeller 16 and out the aquarium filter housing unit 10 through a spray bar 42 secured to the removable top cover 34. As shown in FIG. 15, various accessories (an anchor valve, an elbow joint, a venturi valve, and a venturi tube) 43a-d may be provided for use in conjunction with, or as a substitute to, the spray bar 42.

The bottom chamber 20 also includes a plurality of bottom chamber sidewalls 44, 46, 48, 50, 52, 54 extending about the perimeter of the bottom chamber 20. The bottom chamber 20 further includes a top panel 55 and a base wall 56. The top panel 55 is positioned adjacent the bottom panel 36 of the top chamber 18 and includes an aligned aperture 57 through which the cartridge joint 72 passes to allow for the passage of water between the bottom chamber 20 and the top chamber 18.

Access to the bottom chamber 20 for retrieval and replacement of the filter cartridge 14 is facilitated by the provision of a pivoting door 40 along the bottom chamber 20. The pivoting door 40 is shaped and dimensioned for the retrieval and replacement of filter cartridges 14 in accordance with usage of the present aquarium filter housing unit. In this way a user is permitted to easily open the door 40, remove the filter cartridge 14 from the bottom chamber 20, and insert a new filter cartridge 14 without having to take the entire filter housing 12 out of the water.

In accordance with a preferred embodiment, the filter housing 12 is substantially hexagonally shaped. As such, the top chamber 18 includes first, second, third, fourth, fifth, and sixth top chamber sidewalls 22, 24, 26, 28, 30, 32 (of the fluid impeller housing 15) extending about the perimeter thereof. The first, second, third, fourth, fifth, and sixth top chamber sidewalls 22, 24, 26, 28, 30, 32 are fixedly connected along their respective lateral edges to form a rigid top chamber 18. The lower edges of the respective top chamber sidewalls 22, 24, 26, 28, 30, 32 are coupled to the bottom panel 36 and the top edges of the respective top chamber sidewalls 22, 24, 26, 28, 30, 32 are shaped and dimensioned for selective engagement with the top cover 34. The top chamber sidewalls 22, 24, 26, 28, 30, 32, the bottom panel 36 and the top cover 34 define a space in which the impeller 16 and its supporting structure are housed for creating fluid flow in a manner well known to those skilled in the art.

Similarly, the bottom chamber 20 includes first, second, third, fourth, fifth, and sixth sidewalls 44, 46, 48, 50, 52, 54 extending about the perimeter thereof. While the top chamber sidewalls 22, 24, 26, 28, 30, 32 are fixedly connected along their edges, the bottom chamber 20 has a different construction that allows for incorporation of the door 40 discussed above. In particular, the first, second, and third bottom chamber sidewalls 44, 46, 48 are fixedly connected along their adjacent lateral edges. The first, second, and third bottom chamber sidewalls 44, 46, 48 are coextensive with the first, second, and third top chamber sidewalls 22, 24, 26 so as to define the first, second, and third housing sidewalls. In accordance with aa preferred embodiment, the second housing sidewall (which is composed of the second top chamber sidewall 24 and the second bottom chamber sidewall 46) is concave in shape.

The fourth, fifth, and sixth bottom chamber sidewalls 50, 52, 54 are also fixedly connected to each other along their adjacent lateral edges. A hinge 60 connects the free edge of the third bottom chamber sidewall 48 to the free edge of the fourth bottom chamber sidewall 50 and mating clasps 62a, 62b selectively connect the free edge of the sixth bottom chamber sidewall 54 to the free edge of the first bottom chamber sidewall 44 when the door 40 is closed. In this way, the door 40 defined by the fourth, fifth, and sixth bottom chamber sidewalls 50, 52, 54 is able to pivot relative to the static first, second, and third bottom chamber sidewalls 44, 46, 48. When the door 40 is open a user is able to access the cavity defined by the bottom chamber 20 for retrieval and replacement of the filter cartridge 14. When the door 40 is closed, the fourth, fifth, and sixth bottom chamber sidewalls 50, 52, 54 are aligned with the fourth, fifth, and sixth top chamber sidewalls 28, 30, 32.

As briefly mentioned above, the fluid impeller 16 maintained within the top chamber 18 creates a pressure differential that draws water into the bottom chamber 20 and through the filter cartridge 14. The flow of water into the bottom chamber 20 is facilitated by the provision of apertures 70 along the bottom chamber sidewalls, in particular, in the fifth bottom chamber sidewall 52. As such, the motor of the fluid impeller 16 is automatically turned on when the cord 17 of the motor of the fluid impeller 16 is plugged into the power source, and negative pressure is created in the bottom chamber 20 causing water to be drawn through the apertures 70 and into the filter cartridge 14. The negative pressure draws the water into the filter cartridge 14 and into the fluid impeller 16, which is connected to the top of the filter cartridge 14 via a cartridge joint 72. In particular, the water is drawn through the apertures 70 in the fifth bottom chamber sidewall 52 and into the upwardly flowing intake passageway 71a where the water flows until it is directed downwardly and into the filter cartridge 14. The water then sequentially passes through the top third filter module 14c (course sponge filter), the middle second filter module 14b (carbon filter), and the bottom first filter module 14a (fine sponge module). Upon exiting the bottom first filter module 14a, the water enters the upwardly flowing impeller passageway 71b (via the aperture 73a of the bottom first filter module 14a) and flows into the fluid impeller 16. Once the water reaches the fluid impeller 16, it is forced out of the fluid impeller 16 and into the spray bar 42 where it is returned as clean water to the main body of the aquarium 100.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An aquarium filter housing unit, comprising:
   a top chamber composed of a fluid impeller housing and a fluid impeller; and
   a bottom chamber shaped and dimensioned for selectively receiving a filter cartridge, the bottom chamber includes a plurality of bottom chamber sidewalls and a base wall, wherein a door is provided for selectively accessing a filter cartridge held within in the bottom chamber;
   wherein the top chamber and the bottom chamber are formed as separate units and are held together along a bottom edge of the top chamber and a top edge of the bottom chamber.

2. The aquarium filter housing unit of claim 1, wherein the filter cartridge comprises three stackable modules.

3. The aquarium filter housing unit of claim 2, wherein the three stackable modules comprise a bottom first filter module that is a fine sponge module, a middle second filter module that is a carbon filter module, and a top filter module that is a coarse sponge module.

4. The aquarium filter housing unit of claim 1, wherein the fluid impeller housing comprises a plurality of top chamber walls extending about a perimeter thereof, a top cover, and a bottom panel, the bottom panel includes an aperture allowing for fluid communication between the bottom chamber and the top chamber such that water may be drawn into the bottom chamber through the filter cartridge, into the fluid impeller, and out of the aquarium filter housing unit.

5. The aquarium filter housing unit of claim 4, wherein the bottom chamber comprises a plurality of sidewalls extending about a perimeter of the bottom chamber, a top panel, and a base wall, wherein the top panel is positioned adjacent to the bottom panel of the top chamber and further comprises an aligned aperture through which a cartridge joint passes to allow for passage of water between the bottom chamber and the top chamber.

6. The aquarium filter housing unit of claim 5, wherein the top chamber and the bottom chamber are held together via a friction fit along the bottom edge of the top chamber and the top edge of the bottom chamber.

7. The aquarium filter housing unit of claim 6, wherein the top edge of the bottom chamber includes an upwardly extending lip in which the bottom edge of the top chamber sits.

8. The aquarium filter housing unit of claim 1, wherein both the top chamber and the bottom chamber are hexagonally shaped.

9. The aquarium filter housing unit of claim 1, wherein the top chamber and the bottom chamber are held together via a friction fit along the bottom edge of the top chamber and the top edge of the bottom chamber.

10. The aquarium filter housing unit of claim 9, wherein the top edge of the bottom chamber includes an upwardly extending lip in which the bottom edge of the top chamber sits.

11. The aquarium filter housing unit of claim 1, wherein the door is a pivoting door.

\* \* \* \* \*